United States Patent
Lo et al.

(10) Patent No.: US 12,556,495 B2
(45) Date of Patent: Feb. 17, 2026

(54) DYNAMIC WEIGHTED ECMP EVPN OVERLAY WITH KUBERNETES CONTAINERS

(71) Applicant: Arista Networks, Inc., Santa Clara, CA (US)

(72) Inventors: Alton Lo, Santa Clara, CA (US); Keon Vafai, Milpitas, CA (US); Urvish Panchal, Redmond, WA (US); Jaimeen Parmar, Redmond, WA (US)

(73) Assignee: Arista Networks, Inc., Santa Clara, CA (US)

( * ) Notice: Subject to any disclaimer, the term of this patent is extended or adjusted under 35 U.S.C. 154(b) by 408 days.

(21) Appl. No.: 18/164,970

(22) Filed: Feb. 6, 2023

(65) Prior Publication Data
US 2024/0267341 A1    Aug. 8, 2024

(51) Int. Cl.
*H04L 49/25*    (2022.01)
*H04L 12/46*    (2006.01)
*H04L 45/24*    (2022.01)
*H04L 45/64*    (2022.01)

(52) U.S. Cl.
CPC .......... *H04L 49/25* (2013.01); *H04L 12/4641* (2013.01); *H04L 45/24* (2013.01); *H04L 45/64* (2013.01)

(58) Field of Classification Search
CPC ..... H04L 49/25; H04L 12/4641; H04L 45/24; H04L 45/64
See application file for complete search history.

(56) References Cited

U.S. PATENT DOCUMENTS

| | | | |
|---|---|---|---|
| 9,807,035 B1 * | 10/2017 | Hanks | H04L 49/15 |
| 9,813,356 B1 * | 11/2017 | Kim | H04L 49/1515 |
| 10,257,031 B1 * | 4/2019 | Lamoreaux | H04L 41/0886 |
| 10,666,580 B1 * | 5/2020 | Callaghan | H04L 49/15 |
| 2019/0028352 A1 * | 1/2019 | Rao | H04L 41/22 |

FOREIGN PATENT DOCUMENTS

EP    3474504 A1 *    4/2019    ......... H04L 41/0826

* cited by examiner

*Primary Examiner* — Cheikh T Ndiaye
(74) *Attorney, Agent, or Firm* — Sprinkle IP Law Group

(57) ABSTRACT

Systems, methods and products for distributing traffic to top-of-rack switches (TORs) that dynamically determine their capability to handle traffic and advertise this capability to border leaf router(s). The advertised information may include the bandwidth between the TOR and the instances of the service to which it is connected, and/or the number of instances of the service to which the TOR is connected. The border leaf router computes a distribution of received traffic to the TORs based on this information and forwards traffic to the TORs according to the calculated distribution. As parameters of the TORs and servers change, the TORs can advertise the updated information, and the border leaf router can update its computed distribution to account for the changed parameters.

20 Claims, 5 Drawing Sheets

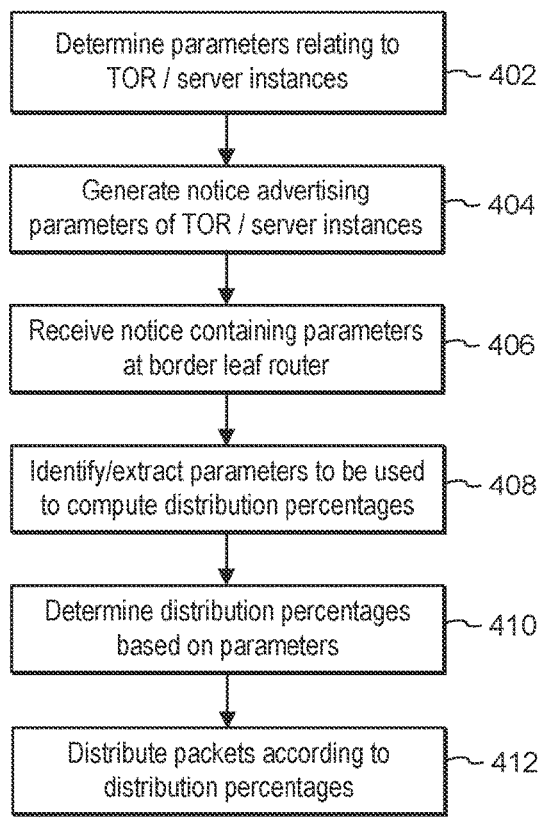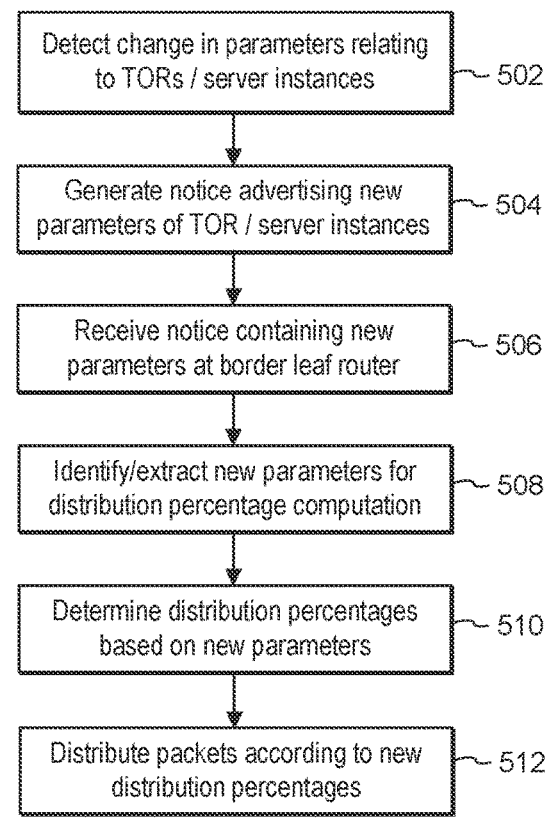
Fig. 4
Fig. 5

DYNAMIC WEIGHTED ECMP EVPN OVERLAY WITH KUBERNETES CONTAINERS

TECHNICAL FIELD

The disclosure relates generally to the processing of traffic through a network, and more particularly to systems, methods and products for determining and advertising capabilities of switches at an outgoing edge of a network fabric and distributing incoming network traffic to the switches in percentages that are based on the advertised capabilities.

BACKGROUND

Many different types of systems use a network architecture to transport data between devices. For example, a data center may use a network to enable clients to request services from servers in the data center, and the data center may provide the requested services through the network.

Conventionally, the data center would receive packets corresponding to requests for service at a customer-facing edge of a network fabric. The packets corresponding to the requests are then routed through the network fabric to switches at a server-facing edge of the network fabric. These switches provide the packets to appropriate instances of a service for processing. The server instances then return data responsive to the requests through the network fabric to the requesting customers.

When a request is sent from a customer to the data center, the packets containing the request are received at the customer-facing edge of the network fabric by a set of one or more border leaf routers that are configured to route the traffic through the network fabric to a set of Top-of-Rack switches (TORs) at the server-facing edge of the network fabric. The TORs then route the traffic to different instances of the data center's servers.

In existing systems, the border leaf routers distribute received traffic evenly between the TORs to which they are connected. This is referred to as equal cost multi-path (ECMP) routing. Thus, for example, if a border leaf router is connected to two TORs, the border leaf router routes 50% of the traffic it receives to the first TOR and 50% of the traffic to the second TOR. The distribution is evenly split between the TORs, even if the TORs do not have equal amounts of bandwidth for communicating traffic to the corresponding servers and/or equal numbers of server instances for processing the traffic. Consequently, the border leaf router may route more traffic to a first TOR than it can handle, while the border leaf router leaves a second TOR with an excess of unused bandwidth and processing capacity.

Because existing systems evenly distribute incoming traffic to the TORs, they may suffer from several problems. For instance, in the example above, the TOR having less bandwidth may not be able to handle all of the packets that are routed to it, so the packets may be delayed before being forwarded to an appropriate server instance, or they may even be dropped (e.g., if the TOR doesn't have the buffer capacity to store all of the packets before they are forwarded). This may in turn result in the customer experiencing timeouts or other disruptions in service. In the case of a TOR that has greater bandwidth and/or processing capacity but does not receive a proportionally greater percentage of the incoming customer traffic, the available bandwidth and/or processing capacity may go unused, which reduces the efficiency of the system.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIG. 4 is a flow diagram illustrating an exemplary process by which a TOR can provide information to a border leaf router for determination of the packet distribution between TORs in accordance with some embodiments.

FIG. 5 is a flow diagram illustrating an exemplary process by which the packet distribution between TORs can be dynamically recomputed in response to changes in the parameters in accordance with some embodiments.

DETAILED DESCRIPTION

Figure 1:
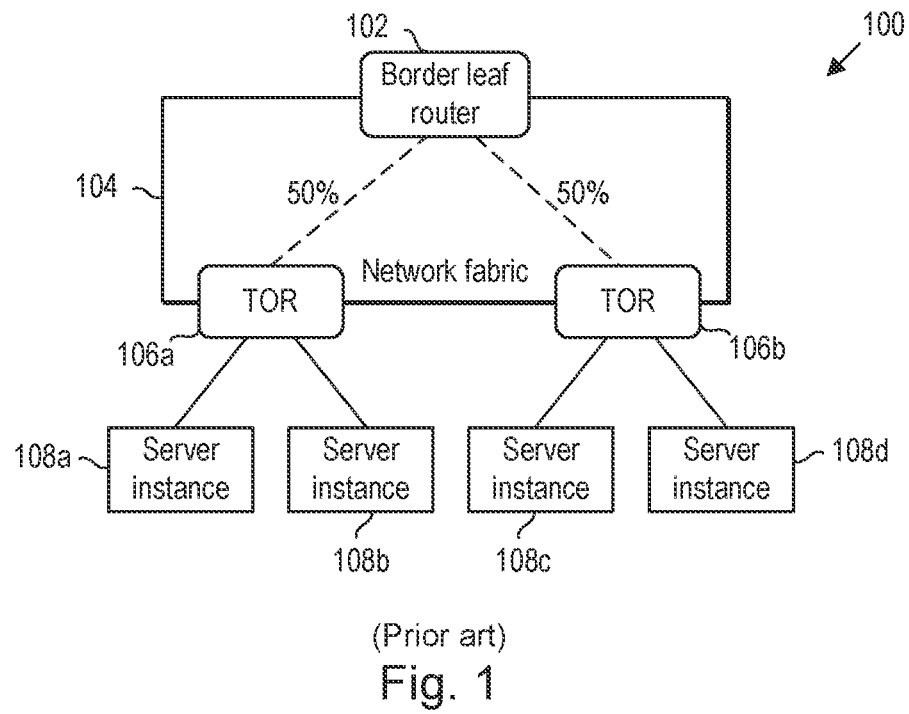
FIG. 1 is a diagram illustrating the topography of a prior art system for distributing traffic from a border leaf router to a plurality of TORs.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Embodiments disclosed herein address the problems described above by having each TOR dynamically determine its capability to handle traffic for a particular service from the border leaf router(s) and advertise this capability to the border leaf router(s) so that they can take this into account when distributing traffic between one or more TORs so that the traffic is not simply distributed equally between the TORs, but is instead weighted according to some function of one or more potentially changing parameters (processing capacity related values) corresponding to the TORs and their respective connected server instances for the particular service. This may be referred to herein as dynamic weighted ECMP routing. In an example embodiment, the TOR's capability to handle traffic for a particular service is determined based on parameters such as the bandwidth between the TOR and the instances of the service to which it is connected, and the number of instances of the service to which the TOR is connected. The TOR can advertise either one of these values or both values to the border leaf router. The border leaf router, upon receiving the advertised information from the TORs to which it is connected, performs a calculation based on the bandwidth information, the numbers of server instances, or both to determine how it will distribute received traffic to the TORs. Traffic for the service that is received by the border leaf router is distributed between the TORs according to the calculated distribution. As the bandwidths of the links between the server instances change and the numbers of server instances change, the information advertised by the TORs to the border leaf routers is updated and the border leaf routers update their calculations and respective distributions of traffic to the TORs based on the updated information.

The embodiments disclosed herein may provide a number of advantages over the prior art. For example, since traffic is distributed by the border leaf routers in a way that takes into account the processing capacities of the different TORs and connected server instances, these embodiments may avoid packets being delayed or dropped as in existing systems, and may therefore also avoid timeouts or other disruptions in service which may occur in existing systems. The present embodiments may also use more of the available bandwidth and/or processing capacity of the server instances, thereby increasing the efficiency of the system.

Before discussing the present embodiments in detail, it may be helpful to consider existing systems and their behavior. As noted above, the issues addressed by the embodiments disclosed herein relate to the distribution of data traffic received in a system such as a data center. More particularly, these issues relate to distribution of data traffic by a border leaf router among the different TORs to which the border leaf router may be connected.

Although the example of a data center is used herein to illustrate the issues of concern, the problem and the solutions apply to other network architectures as well. The components of the example systems described herein should therefore be construed to include comparable devices in other systems. For instance, the network fabric that interconnects the border leaf routers and TORs in the example systems may include any type of network or data transport links. Similarly, the border leaf routers should be construed to include any suitable network device that routes traffic to a TOR or similar device, and the server instances should be construed to include, e.g., comparable servers, virtual machines, Kubernetes containers or workloads, or other groupings or containers of servers.

The topography of devices in the system (including the border leaf routers, network fabric, TORs and servers) is substantially the same as in the present embodiments. This topography is illustrated in FIG. 1. As depicted in FIG. 1, a border leaf router 102 of system 100 is connected to a network fabric 104. The border leaf router receives traffic from customers of the data center and routes the traffic through network fabric 104 to a set of TORs 106. It should be noted that different instances of the same or similar devices may be identified herein by a common reference number followed by a letter. For instance, this system includes TOR 106a and TOR 106b. The individual TORs may be referred to collectively by the number alone (e.g., TORs 106).

TORs 106 are connected to a set of server instances 108 that are configured to serve data requests received from customers of the data center. The data requests are received by the server instances from the respective ones of TORs 106 to which the server instances are connected. Since border leaf router 102 is connected through network fabric 104 to both TOR 106a and TOR 106b, data traffic received by border leaf router 102 from the customers may be routed to server instances 108 through either TOR 106a or TOR 106b.

In existing systems, border leaf router 102 distributes the data traffic to TORs 106 using equal cost multi-path (ECMP) routing. Very simply, border leaf router 102 distributes the data traffic equally between the two TORs. Half of the data traffic is routed to TOR 106a, and the other half of the data traffic is routed to TOR 106b. If border leaf router 102 were connected to three TORs, it would distribute 1/3 of the traffic to each of the TORs. If there were N routers, then 1/N of the data traffic would be routed to each of the TORs. Each TOR would then forward the data traffic received by that TOR to the server instances connected to the TOR.

The problem is that, even though each of the TORs receives the same amount of data traffic from the border leaf router, the TORs may not be able to handle the same amount of traffic. For example, one of the TORs may have lower-bandwidth (e.g., 1 Gbps) links to its server instances while the other TOR has higher-bandwidth (e.g., 10 Gbps) links to its server instances. If the border leaf router evenly distributes data traffic between the two TORs, the TOR having the lower-bandwidth links may be unable to handle the received data traffic, while the TOR having the higher-bandwidth links may be able to handle the data traffic it receives and still have unused bandwidth.

In the case of the first TOR (which has less bandwidth), the packets that are routed to this TOR may be delayed before being forwarded to an appropriate server instance, which reduces the quality of service. The packets may even be dropped if the TOR doesn't have the buffer capacity to store the packets before they can be forwarded to a server instance. The customer may therefore experience timeouts or other disruptions in attempting to obtain service. In the case of the TOR that has greater bandwidth, the TOR does not receive enough data traffic to fully utilize its processing resources, even as the other TOR may be delaying or dropping packets. (Although not noted in the example, the two TORs may have access to different amounts of processing capacity by the connected server instances, so these resources may be underutilized as well.)

Figure 2:
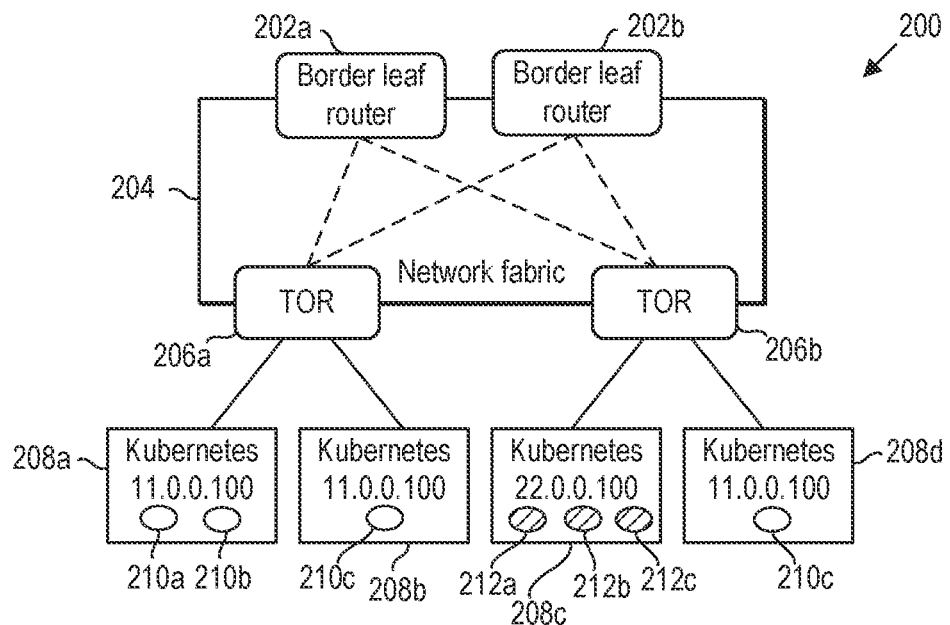
FIG. 2 is a diagram illustrating the topography of an example system for providing data services to customers in accordance with some embodiments.

Referring to FIG. 2, an example system for providing services to customers in accordance with some embodiments is shown. This figure may represent, for example, a data center system. Customer requests for service are received by the system, communicated to appropriate servers, and then data is returned responsive to the service requests. The present embodiments are directed to the transport of the received service requests to the servers, so the return of data responsive to the customer requests will not be discussed in detail herein.

As shown in FIG. 2, system 200 includes two border leaf routers 202 which are connected to an ingress side of network fabric 204. A pair of TORs 206 are connected to the egress side of the network fabric. Each of TORs 206 is connected to a corresponding set of Kubernetes containers 208. Each of the Kubernetes containers contains a corresponding set of virtual machines or server instances 210 and/or 212.

In this example, the first TOR (206a) is connected to Kubernetes containers 208a and 208b. The second TOR (206b) is connected to Kubernetes containers 208c and 208d. Each of Kubernetes containers 208a and 208b is connected to TOR 206a by a 1 Gbps link. Each of Kubernetes containers 208c and 208d is connected to TOR 206b by a 10 Gbps link. Kubernetes container 208a contains two instances of virtual machines (210a and 210b), while Kubernetes container 208b contains one virtual machine instance (210c). Kubernetes container 208c contains 3 virtual machine instances (212a, 212b, 212c), while Kubernetes container 208d contains a single virtual machine instance (210d). As indicated in the figure, virtual machine instances 210 are instances corresponding to virtual IP address 11.0.0.100, while virtual machine instances 212 correspond to virtual IP address 22.0.0.100.

Figure 3:
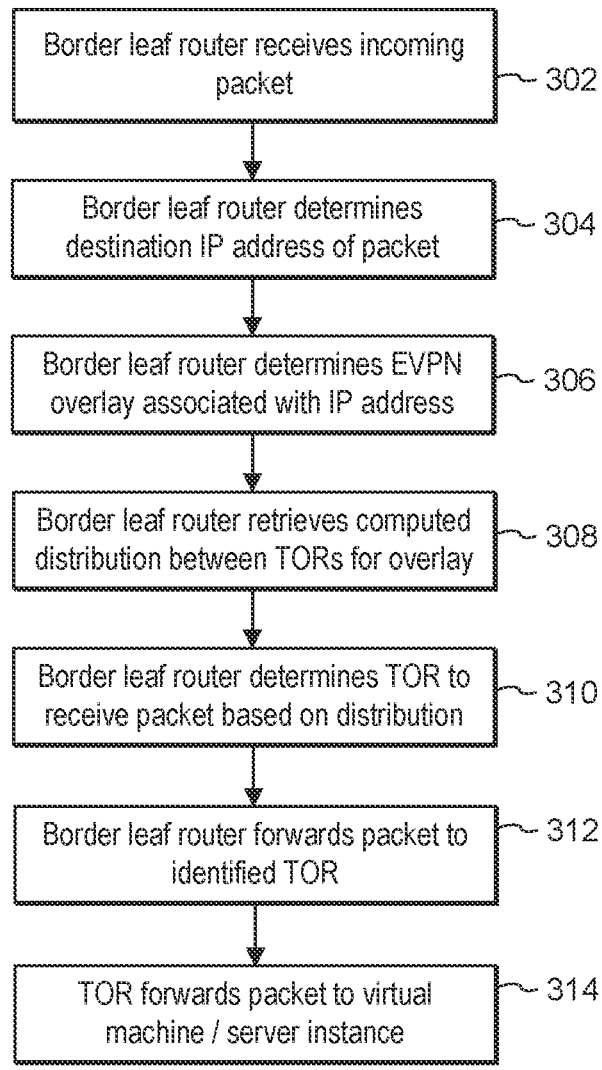
FIG. 3 is a flow diagram illustrating the operation of a data center system in accordance with some embodiments.

Referring to FIG. 3, a flow diagram is shown to illustrate the operation of a border leaf router of data center system 200 in accordance with some embodiments. At step 302, a packet is received by one of the border leaf routers. The border leaf router then determines the destination associated with the packet. In this case, the destination will be one of the two virtual IP addresses (11.0.0.100 or 22.0.0.100) associated with the virtual machines in the Kubernetes containers (304).

Based on the destination's virtual IP address, the border leaf router will determine the ethernet virtual private network (EVPN) overlay associated with the IP address (306). For example, if the virtual IP address is 11.0.0.100, the EVPN overlay will include both TORs (206a and 206b), since each is connected to Kubernetes containers that contain virtual machines associated with this IP address. If, on the other hand, the virtual IP address were 22.0.0.100, the corresponding EVPN overlay includes only the second TOR (206b) since it is the only TOR connected to a Kubernetes container that contains virtual machines associated with this IP address.

The border leaf router then determines the packet distribution that has been defined for the applicable EVPN overlay (308). For each of the EVPN overlays, the border leaf router has previously computed packet distribution percentages associated with each of the TORs in the overlay. These percentages may be based on various parameters, such as the bandwidths of the links between the TORs and the respective Kubernetes containers, the numbers of virtual machines in the Kubernetes containers which are available to service incoming requests, or both. Other parameters may also be used in alternative embodiments to determine the packet distribution between the TORs.

Based on the identified distribution for the EVPN overlay, the border leaf router determines which TOR in the overlay should receive the packet (310). The border leaf router may maintain any suitable data structure to keep track of which TOR should receive the next packet. In one embodiment, the border leaf router may maintain the distribution in the forwarding information base (FIB) table. For example, if the border leaf router determines that 25% of the packets should be distributed to the first TOR and 75% of the packets should be distributed to the second TOR, the FIB table may be programmed as follows:

VRF-one, 22.0.0.100/32
   nh=TOR1 (weight=1)
   nh=TOR2 (weight=3)

After it has been determined which TOR should receive the packet, the border leaf router forwards the packet to the determined TOR (312). The TOR then forwards the packet to one of the virtual machines in one of the Kubernetes containers connected to the TOR (314). The processes used by the TOR to determine the distribution of packets to the various virtual machines is beyond the scope of this disclosure.

Referring to FIG. 4, a flow diagram is shown to illustrate an exemplary process by which a TOR can provide information to the border leaf router for determination of the packet distribution between TORs in accordance with some embodiments. At step 402, the TOR determines one or more characteristics or parameters of the server instances to which it is connected. As noted above, these characteristics may include the bandwidth of a communication link between the TOR and the server instances, and/or the processing capacity of the server instances (e.g., the number of server instances). Other parameters may also be determined by the TOR and so that they can be taken into consideration by the border leaf router.

At step 404, the TOR generates a notice that can be provided to communicate the identified parameter values to the border leaf router. This notice is received by the border leaf router (406), which identifies add extracts the parameter values from the notice (408). The border leaf router then uses the extracted parameter values to compute a distribution to be used in routing packets to the connected TORs (410). Once the distribution has been computed by the border leaf router, it can be used to distribute packets that are thereafter received by the border leaf router (412).

The distribution that is used by the border leaf router can be dynamically determined, so that the packets received by the border leaf router can be routed to the TORs based on the current, potentially updated conditions/parameters associated with the TORs.

Referring to FIG. 5, a flow diagram is shown to illustrate an exemplary process by which the packet distribution between TORs can be dynamically recomputed in response to changes in the parameters in accordance with some embodiments. At step 502, one of the TORs detects a change in one of the parameters associated with the TOR. Using the updated parameters, the TOR generates an updated notice containing the updated parameters and provides this notice to the border leaf router (504). When the border leaf router receives the updated notice (506), it identifies and extracts the updated parameters from the notice (508). The border leaf router then recomputes the distribution for each of the TORs (510) and distributes received packets according to the computed distribution percentages (512).

Figure 6A:
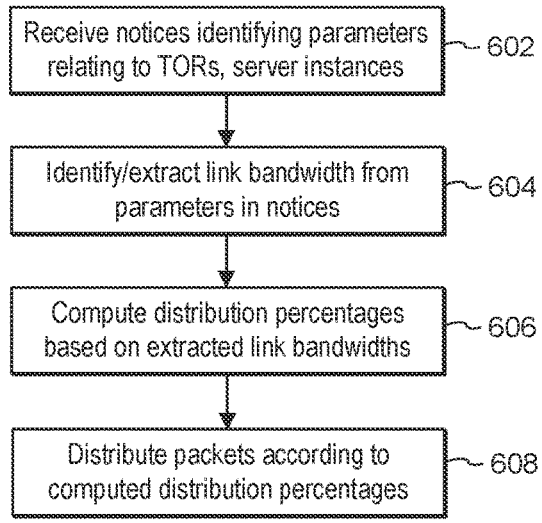
FIGS. 6A-6C are a set of flow diagrams illustrating the computation of packet distributions from a border leaf router to a set of connected TORs in accordance with some embodiments.
Figure 6B:
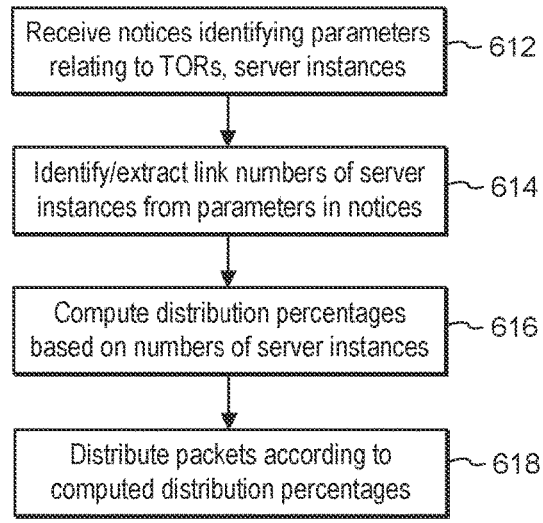
Figure 6C:
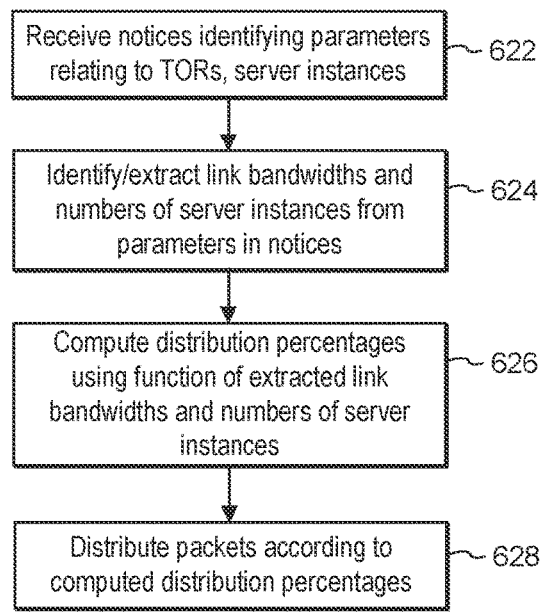

Referring to FIGS. 6A-6C, a set of flow diagrams are shown to illustrate the computation of packet distributions from a border leaf router to a set of connected TORs in accordance with some embodiments. FIG. 6A illustrates packet distribution based on the bandwidths of the links connecting the server instances to the TORs. FIG. 6B illustrates packet distribution based on the numbers of server instances connected to the TORs. FIG. 6C illustrates packet distribution based on multiple parameters, including the bandwidths of the links connecting the server instances to the TORs and the numbers of server instances connected to the TORs.

Referring to FIG. 6A, a process is illustrated for controlling the distribution of packets received by a border leaf router based on the bandwidths of communication links between each TOR and the server instances to which it is connected. At step 602, the border leaf router receives information indicating the bandwidth of each link that connects one of the server instances to a corresponding one of the TORs. In some embodiments, each TOR collects the relevant information and generates a notification that is then provided to the border leaf router. The notification may include information relating to various different parameters which include, but are not limited to the bandwidths of the respective communication links. The border leaf router then extracts from the notifications the link bandwidths corresponding to each of the TORs (604). Using the extracted bandwidths, the border leaf router computes a distribution between the TORs (606). For example, if one TOR has an aggregate bandwidth of 5 Gbps and the other TOR has an aggregate bandwidth of 10 Gbps, the border leaf router will compute a distribution of 33% (5 Gbps/(5 Gbps+10 Gbps)) to the first TOR and 67% (10 Gbps/(5 Gbps+10 Gbps)) to the second TOR. These percentages are then stored by the border leaf router. As data packets are received by the border leaf router, the percentages are used to control the distribution of the packets from the border leaf router to the TORs (608). Using the example of a 33%/66% distribution, for every packet forwarded to the first TOR, two packets will be forwarded to the second TOR.

Referring to FIG. 6B, a process is illustrated for controlling the distribution of packets received by a border leaf router based on the number of server instances to which each TOR is connected. At step 612, the border leaf router receives information indicating the number of servers connected to each TOR. As in the process of FIG. 6A, each TOR collects the relevant information and generates a notification that is provided to the border leaf router. The notification may include information other than the number of server instances (e.g., the bandwidths of communication links connecting the server instances to the TOR). The border leaf router then extracts the required information (the number of server instances) from the notifications from each of the TORs (614).

Using the extracted information, the border leaf router computes a distribution between the TORs (616). For example, if a first TOR is connected to three server instances and a second TOR is connected to one server instance, the border leaf router will compute a distribution of 75% (3 server instances/(3 server instances+1 server instance)) to the first TOR and 25% (1 server instance/(3 server instances+1 server instance)) to the second TOR and store the computed percentages. As data packets are received by the border leaf router, the stored percentages are used to control the distribution of the packets from the border leaf router to the TORs (618). In this, for every three packets forwarded to the first TOR, one packet will be forwarded to the second TOR.

Referring to FIG. 6C, a process is illustrated for controlling the distribution of packets received by a border leaf router based on multiple parameters. At step 622, the border leaf router receives information indicating multiple parameters associated with the servers connected to each TOR. The parameters may include, for example, the bandwidths of communication links between each TOR and the server instances, the number of server instances connected to each TOR, or any other parameters that relate to the processing of data packets through the TORs and server instances. The border leaf router extracts multiple parameters from the notifications from each of the TORs (624) and, using the extracted information, computes a distribution between the TORs (626). The distribution may be computed by evaluating any appropriate function of the parameters. The border leaf router may for instance, use a simple function (e.g., one that adds weighted parameter values associated with each TOR), or a more complicated function. The border leaf router then distributes received packets to the TORs according to the computed distribution (628).

Figure 7:
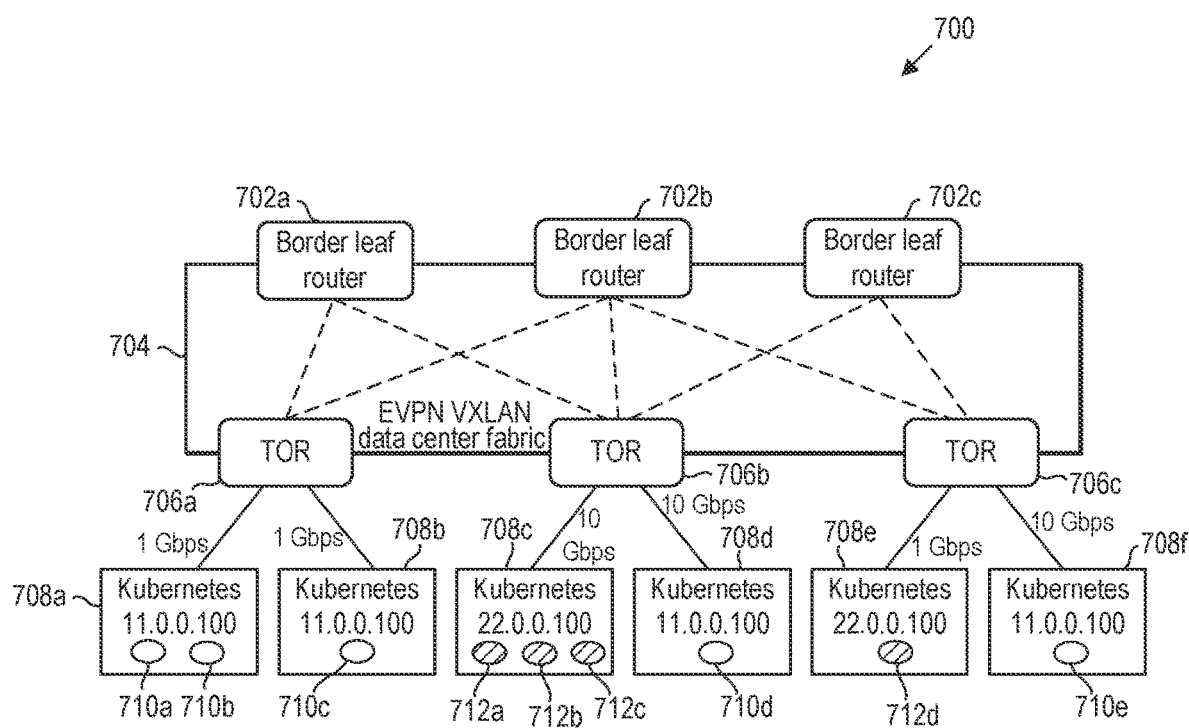
FIG. 7 is a diagram illustrating an example data center system in accordance with some embodiments.

Referring to FIG. 7, a diagram is shown to illustrate an example data center system 700 that operates in accordance with one embodiment. In this example, a set of border leaf routers 702 are connected to an ingress side of an EVPN virtual extensible local area network (VXLAN) data center network fabric 704. A set of TORs 706 are connected to the egress side of network fabric 704. TORs 706 are connected to corresponding Kubernetes containers 708 that contain virtual machines (server instances) 710 and 712.

In this example, there are three border leaf routers: 702a, 702b, 702c. Each of the border leaf routers is connected via network fabric 704 to a different set of TORs 706. Border leaf router 702a is connected to TORs 706a and 706b, while border leaf router 702b is connected to TORs 706a, 706b and 706c, and border leaf router 702c is connected to TORs 706b and 706c. Each of the border leaf routers determines its own distribution of received data packets among the TORs to which it is connected. Accordingly, each border leaf router computes its respective distributions based on the TORs to which it is connected—the TORs to which the border leaf router is not connected do not affect the distributions computed by the border leaf router.

Each of TORs 706 is connected to two corresponding Kubernetes containers. TOR 706a is connected to containers 708a and 708b by corresponding 1 Gbps communication links. TOR 706b is connected to containers 708c and 708d by corresponding 10 Gbps communication links. TOR 706c is connected to containers 708e and 708f by corresponding communication links, one of which has a 1 Gbps bandwidth and the other of which has a 10 Gbps bandwidth. The Kubernetes containers are running border gateway protocol (BGP) peering with the nearest TOR. Each Kubernetes container 708 contains a corresponding set of virtual machines 710, 712. Virtual machines 710 are associated with virtual IP address 11.0.0.100, while virtual machines 712 are associated with virtual IP address 22.0.0.100.

In this example, each Kubernetes container advertises its virtual IP to the TOR as a BGP route exchange. The TORs advertise the information received from the Kubernetes container, as well as the bandwidths of the links to the Kubernetes containers to the border leaf routers using EVPN Type 5 IP prefix route advertisements. Thus, since border leaf router 702a has a 2-way overlay with TORs 706a and 706b, it receives advertisements from both of these TORs, which include information about these TORs, as well as Kubernetes containers 708a-708d and the links between the TORs and the respective Kubernetes containers. Similarly, border leaf router 702b has a 3-way overlay with TORs 706a-706c and receives advertisements with information about these TORs, including the information received from Kubernetes containers 708a-708d and the links to these containers. Likewise, border leaf router 702c has a 2-way overlay with TORs 706b-706c and receives advertisements with information about these TORs and the corresponding Kubernetes containers.

Based on the information advertised by the respective TORs, each of the border leaf routers 702 computes distribution percentages for each of the connected TORs. These distribution percentages are computed separately for each destination virtual IP to which a received packet may be addressed. In this example, each of the border leaf routers is connected to TORs which are in turn connected to virtual machines at IP addresses 11.0.0.100 and 22.0.0.100. Consequently, each border leaf router will compute a distribution percentage corresponding to each of these virtual IPs.

For example, border leaf router 702a, in the case of virtual IP address 11.0.0.100, uses information received from each of TORs 706a and 706b since each of these TORs is connected to at least one Kubernetes container that contains virtual machines having this virtual IP. If the received packets having this destination IP are to be distributed based on the respective bandwidths of the links between the TORs and the Kubernetes containers, the border leaf router would see that TOR 706a has two links to its Kubernetes containers, each with 1 Gbps of bandwidth, and that TOR 706b has one 10 Gbps link to the container having the virtual machine with this virtual IP. Since TOR 706a has 2 Gbps of bandwidth to its virtual machines at virtual IP 11.0.0.100 and TOR 706b has 10 Gbps of bandwidth in its link to the virtual machine with this virtual IP, the border leaf router will distribute 17% (2/(2+10)) of the received packets to TOR 706a, and 83% (10/(2+10)) of the received packets to TOR 706b. In the case of virtual IP address 22.0.0.100, border leaf router 702a is only connected to one TOR (706b) which is connected to virtual machines at this virtual IP. Consequently, 100% of the received packets addressed to this virtual IP will be forwarded to TOR 706b.

If border leaf router 702a were configured to use the numbers of virtual machines as the basis for computing the distribution of packets between the TORs, the computation would be similar. In the case of virtual IP address 11.0.0.100, the border leaf router would use information received from TORs 706a and 706b to determine that there are three virtual machines connected to TOR 706a and one virtual machine connected to TOR 706b. Consequently, the border leaf router would distribute 75% (3/(3+1)) of the received traffic destined for virtual IP 11.0.0.100 to TOR 706a and 25% (1/(3+1)) to TOR 706b. In the case of virtual IP address 22.0.0.100, the border leaf router would use information received from TORs 706a and 706b to determine that the only virtual machines associated with this virtual IP are connected to TOR 706b. 100% of the received traffic destined for this virtual IP would be forwarded from border leaf router 702a to TOR 706b.

Distribution percentages for border leaf routers 702b and 702c would be computed in the same manner. Border leaf router 702b computes the distribution percentages using information from connected TORs 706a-706c. When using link bandwidths as the basis for distributing received traffic, the border leaf router would compute a distribution, for packets directed to virtual IP 11.0.0.100, of 9%, 45.5% and 45.5%, respectively, for TORs 706a, 706b and 706c. For packets directed to virtual IP 22.0.0.100, border leaf router 702b would compute a bandwidth-based distribution of 0%, 91% and 9%, respectively, for TORs 706a, 706b and 706c. For distributions based on the numbers of virtual machines, border leaf router 702b would compute distributions for virtual IP 11.0.0.100 of 60%, 20% and 20%, respectively, for TORs 706a, 706b and 706c. Border leaf router 702b would compute distributions for virtual IP 22.0.0.100 of 0%, 75% and 25%, respectively, for TORs 706a, 706b and 706c.

Border leaf router 702c computes the distribution percentages using information from connected TORs 706b and 706c. When using link bandwidths as the basis for distributing received traffic, this border leaf router would compute a distribution, for virtual IP 11.0.0.100, of 50% and 50%, for the TORs. For packets directed to virtual IP 22.0.0.100, border leaf router 702c would compute a bandwidth-based distribution of 91% and 9%, respectively, for TORs 706b and 706c. For distributions based on the numbers of virtual machines, border leaf router 702c would compute distributions for virtual IP 11.0.0.100 of 50% and 50% for the TORs. Border leaf router 702c would compute distributions based on numbers of virtual machines for virtual IP 22.0.0.100 of 75% and 25%, respectively, for TORs 706b and 706c.

It should be noted that the border leaf routers could, instead of using direct comparisons of the bandwidths or numbers of virtual machines, use weighted, non-linear, rounded or other functions of these parameters to compute the relative distributions of the received packets. The border leaf routers could also use functions of multiple parameters.

One embodiment comprises a system for distribution of traffic through a network. This system includes a network having one or more border leaf routers connected to an ingress edge of the network and a plurality of TORs connected to an egress edge of the network. A plurality of servers are connected to the TORs. Each of the TORs is connected to a corresponding subset of the servers. Each of the TORs is configured to advertise a corresponding set of values for processing capacity factors associated with the TOR and the corresponding subset of the servers. Each border leaf router is configured to receive, from each of the TORs to which the border leaf router is connected, the corresponding set of values for the processing capacity factors. The border leaf router is also configured to determine, for each of the TORs to which the border leaf router is connected, a percentage of incoming traffic to be forwarded to the TOR. The border leaf router then receives incoming traffic for the plurality of servers and distributes the received incoming traffic to the TORs to which the border leaf router is connected according to the determined percentages.

In some embodiments, the processing capacity factors include at least one of: a communication link bandwidth; and a number of available server instances. In some embodiments, In some embodiments, the border leaf router is configured to determine the percentage for each of the TORs to which the border leaf router is connected by dividing a communication link bandwidth value for the TOR by a total communication link bandwidth value for all of the communication links of the two or more TORs. In some embodiments, the border leaf router is configured to determine the percentage for each of the TORs to which the border leaf router is connected by dividing a number of available server instances for the TOR by a total a number of available server instances for all of the communication links of the two or more TORs. In some embodiments, the border leaf router is configured to determine the percentages for the TORs separately for each individual destination IP address in the received incoming traffic.

In some embodiments, the plurality of servers comprises server instances, and the system further comprises a plurality of Kubernetes containers, each of the Kubernetes containers containing one or more of the server instances. Each of the Kubernetes containers may be connected by a corresponding communication link to a corresponding one of the TORs, the communication link having a corresponding bandwidth. The system may comprise a data center.

An alternative embodiment is a network device comprising a border leaf router which is connected to an ingress side of a network. The border leaf router is configured to receive, from a set of TORs connected to the border leaf router via the network, corresponding notices advertising values for processing capacity factors associated with the TORs and server instances connected to the TORs. The border leaf router is configured to determine, for each of the TORs to which the border leaf router is connected, the corresponding set of values for the processing capacity factors, and then generate, for each of the TORs to which the border leaf router is connected, a percentage of incoming traffic to be forwarded to the TOR. Thereafter, the border leaf router receives incoming traffic for the plurality of servers and distributes the received incoming traffic to the TORs to which the border leaf router is connected according to the determined percentages.

In some embodiments, the processing capacity factors include at least one of: a communication link bandwidth; and a number of available servers. In some embodiments, the border leaf router is configured to determine the percentage, for each of the TORs to which the border leaf router is connected, by dividing a communication link bandwidth value for the TOR by a total communication link bandwidth value for all of the communication links of the two or more TORs. In some embodiments, the border leaf router is configured to determine the percentage, for each of the TORs to which the border leaf router is connected, by dividing a number of available servers for the TOR by a total a number of available servers for all of the TORs connected to the border leaf router. The border leaf router may be configured to determine the percentages for the TORs separately for each individual destination IP address in the received incoming traffic.

In some embodiments, the plurality of servers comprise server instances, each server instance being contained in a corresponding Kubernetes container. Each of the Kubernetes containers may be connected by a corresponding communication link to a corresponding one of the TORs, the communication link having a corresponding bandwidth.

In some embodiments, the border leaf router is connected to an ingress edge of a data center network fabric.

Another alternative embodiment comprises a method for determining a distribution of traffic by a border leaf router to a set of TORs connected to the border leaf router. The method includes receiving a notice from each of the TORs advertising a corresponding set of values for processing capacity factors associated with the TOR and a corresponding subset of server instances. The border leaf router then extracts one or more of the values for processing capacity factors contained in each of the notices and generates, for each of the TORs, a percentage of incoming traffic to be forwarded to the TOR based on the extracted values for the processing capacity factors. The border leaf router then distributes received incoming traffic to the TORs according to the generated percentages.

In some embodiments, the processing capacity factors include at least a communication link bandwidth; where generating the percentage of incoming traffic to be forwarded to each TOR comprises dividing a communication link bandwidth value for the TOR by a total communication link bandwidth value for all communication links of the TORs connected to the border leaf router. In some embodiments, the processing capacity factors include at least a number of available servers, where generating the percentage of incoming traffic to be forwarded to each TOR comprises dividing a number of available servers for the TOR by a total number of available servers for all communication links of the TORs connected to the border leaf router. In some embodiments, the border leaf router is configured to determine the percentages for the TORs separately for each individual destination IP address in the received incoming traffic.

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature or function, including any such embodiment feature or function described. While specific embodiments of, and examples for, the embodiments are described herein for illustrative purposes only, various equivalent modifications are possible within the spirit and scope of the disclosure, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments in the disclosure will be employed without a corresponding use of other features, and features described with respect to one embodiment may be combined with features of other embodiments without departing from the scope and spirit of the disclosure as set forth.

What is claimed is:

1. A system for distribution of traffic through a network comprising:
    a plurality of servers;
    a network including one or more border leaf routers and two or more top-of-rack switches (TORs), wherein each border leaf router is configured to receive incoming traffic for the plurality of servers and distribute the received incoming traffic to ones of the TORs to which the border leaf router is connected;
    wherein each of the TORs is connected to a corresponding subset of the servers,
    wherein each of the TORs is configured to advertise a corresponding set of values for processing capacity factors, including a set of processing capacity factors of the TOR and a set of processing capacity factors of the corresponding subset of the servers; and
    wherein each border leaf router is configured to:
        receive, from each of the TORs to which the border leaf router is connected, the corresponding set of values for the processing capacity factors,
        determine, for each of the TORs to which the border leaf router is connected, a percentage of incoming traffic to be forwarded to the TOR based on the processing capacity factors,
        receive incoming traffic for the plurality of servers, and
        distribute the received incoming traffic to the TORs to which the border leaf router is connected according to the determined percentages.

2. The system of claim 1, wherein the processing capacity factors include a number of available server instances.

3. The system of claim 2, wherein the border leaf router is configured to determine the percentage, for each of the TORs to which the border leaf router is connected, using a function of one or more of the processing capacity factors.

4. The system of claim 2, wherein the border leaf router is configured to determine the percentage, for each of the TORs to which the border leaf router is connected, by dividing a communication link bandwidth value for the TOR by a total communication link bandwidth value for all of the communication links of the two or more TORs.

5. The system of claim 2, wherein the border leaf router is configured to determine the percentage, for each of the TORs to which the border leaf router is connected, by dividing the number of available server instances for the TOR by a total a number of available server instances for all of the communication links of the two or more TORs.

6. The system of claim 1, wherein the border leaf router is configured to determine the percentages for the TORs separately for each individual destination IP address in the received incoming traffic.

7. The system of claim 1, further comprising a plurality of Kubernetes containers, each of the Kubernetes containers containing one or more of the server instances.

8. The system of claim 7, wherein each of the Kubernetes containers is connected by a corresponding communication link to a corresponding one of the TORs, the communication link having a corresponding bandwidth.

9. A network device comprising:
a border leaf router connected to an ingress side of a network;
wherein the border leaf router is configured to:
receive, from a set of top-of-rack switches (TORs) connected to the border leaf router via the network, corresponding notices advertising values for processing capacity factors of the TORs and processing capacity factors of server instances connected to the TORs;
wherein the border leaf router is configured to:
determine, for each of the TORs to which the border leaf router is connected, the corresponding set of values for the processing capacity factors, including processing capacity factors of the TOR and the processing capacity factors of the server instances connected to the TOR,
determine, for each of the TORs to which the border leaf router is connected, a percentage of incoming traffic to be forwarded to the TOR based on the processing capacity factors,
receive incoming traffic for the plurality of server instances, and
distribute the received incoming traffic to the TORs to which the border leaf router is connected according to the determined percentages.

10. The network device of claim 9, wherein the processing capacity factors of the server instances include a number of available ones of the server instances.

11. The network device of claim 10, wherein the border leaf router is configured to determine the percentage, for each of the TORs to which the border leaf router is connected, using a function of one or more of the processing capacity factors.

12. The network device of claim 10, wherein the border leaf router is configured to determine the percentage, for each of the TORs to which the border leaf router is connected, by dividing a communication link bandwidth value for the TOR by a total communication link bandwidth value for all of the communication links of the two or more TORs.

13. The network device of claim 10, wherein the border leaf router is configured to determine the percentage, for each of the TORs to which the border leaf router is connected, by dividing a number of available server instances for the TOR by a total a number of available server instances for all of the TORs connected to the border leaf router.

14. The network device of claim 9, wherein the border leaf router is configured to determine the percentages for the TORs separately for each individual destination IP address in the received incoming traffic.

15. The network device of claim 9, each server instance of the plurality of server instances being contained in a corresponding Kubernetes container.

16. The network device of claim 15, wherein each of the Kubernetes containers is connected by a corresponding communication link to a corresponding one of the TORs, the communication link having a corresponding bandwidth.

17. A method for determining a distribution of traffic by a border leaf router to a set of top-of-rack switches (TORs) connected to the border leaf router, the method comprising:
receiving, by the border leaf router, a notice from each of the TORs advertising a corresponding set of values for processing capacity factors, including a set of processing capacity factors of the TOR and a set of processing capacity factors of a corresponding subset of server instances;
extracting, by the border leaf router, one or more of the values for the processing capacity factors contained in each of the notices;
generating, by the border leaf router for each of the TORs, a percentage of incoming traffic to be forwarded to the TOR based on the extracted values for the processing capacity factors; and
distributing, by the border leaf router, received incoming traffic to the TORs according to the generated percentages.

18. The method of claim 17, wherein the processing capacity factors include at least a communication link bandwidth; wherein generating the percentage of incoming traffic to be forwarded to each TOR comprises dividing a communication link bandwidth value for the TOR by a total communication link bandwidth value for all communication links of the TORs connected to the border leaf router.

19. The method of claim 17, wherein the processing capacity factors include at least a number of available server instances, wherein generating the percentage of incoming traffic to be forwarded to each TOR comprises dividing a number of available server instances for the TOR by a total number of available server instances for all communication links of the TORs connected to the border leaf router.

20. The method of claim 17, wherein the border leaf router is configured to determine the percentages for the TORs separately for each individual destination IP address in the received incoming traffic.

* * * * *